(12) United States Patent
Matsuda et al.

(10) Patent No.: US 9,231,245 B2
(45) Date of Patent: Jan. 5, 2016

(54) POSITIVE ELECTRODE PLATE FOR NONAQUEOUS ELECTROLYTE SECONDARY BATTERY, METHOD FOR MANUFACTURING THE POSITIVE ELECTRODE PLATE, NONAQUEOUS ELECTROLYTE SECONDARY BATTERY, AND METHOD FOR MANUFACTURING THE BATTERY

(75) Inventors: Tetsuya Matsuda, Hyogo (JP); Naoki Ogawa, Hyogo (JP); Keisuke Minami, Hyogo (JP); Toyoki Fujihara, Hyogo (JP); Toshiyuki Nohma, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 148 days.

(21) Appl. No.: 14/006,828

(22) PCT Filed: Mar. 15, 2012

(86) PCT No.: PCT/JP2012/056614
§ 371 (c)(1),
(2), (4) Date: Sep. 23, 2013

(87) PCT Pub. No.: WO2012/128160
PCT Pub. Date: Sep. 27, 2012

(65) Prior Publication Data
US 2014/0011064 A1    Jan. 9, 2014

(30) Foreign Application Priority Data

Mar. 23, 2011  (JP) .................................. 2011-064775
Aug. 31, 2011  (JP) .................................. 2011-189654

(51) Int. Cl.
*H01M 4/62*      (2006.01)
*H01M 4/139*     (2010.01)
(Continued)

(52) U.S. Cl.
CPC .............. *H01M 4/139* (2013.01); *H01M 4/366* (2013.01); *H01M 4/623* (2013.01); *H01M 2004/028* (2013.01); *H01M 2220/20* (2013.01); *Y02E 60/122* (2013.01)

(58) Field of Classification Search
None
See application file for complete search history.

(56) References Cited

U.S. PATENT DOCUMENTS

2002/0197535 A1    12/2002  Dudley et al.
2003/0224242 A1    12/2003  Kaito et al.
(Continued)

FOREIGN PATENT DOCUMENTS

CA        2448012 A    12/2002
CN        1469503 A     1/2004
(Continued)

OTHER PUBLICATIONS

Machine translation of JP 2008-047398, retrieved from <https://www.j-platpat.inpit.go.jp/web/all/top/BTmTopEnglishPage> on Apr. 27, 2015.*
(Continued)

*Primary Examiner* — Cynthia K Walls
(74) *Attorney, Agent, or Firm* — Westerman, Hattori, Daniels & Adrian, LLP (57) ABSTRACT

A positive electrode plate for a nonaqueous electrolyte secondary battery, the positive electrode plate including: a positive electrode substrate; a positive electrode active material layer formed on the positive electrode substrate; and a positive electrode substrate exposed portion on which the positive electrode active material layer is not formed, the positive electrode substrate exposed portion having a region that is adjacent to the positive electrode active material layer and has a protective layer formed thereon, the positive electrode active material layer and the protective layer containing polyvinylidene fluoride, and the weight average molecular weight Mw of the polyvinylidene fluoride contained in the protective layer being larger than the weight average molecular weight Mw of the polyvinylidene fluoride contained in the positive electrode active material layer. Thus, a high reliable nonaqueous electrolyte secondary battery where the widths of the positive electrode material and the protective layers are stable can be provided.

19 Claims, 3 Drawing Sheets

(51) Int. Cl.
*H01M 4/36* (2006.01)
*H01M 4/02* (2006.01)

(56) References Cited

U.S. PATENT DOCUMENTS

| | | | |
|---|---|---|---|
| 2006/0204836 A1 | 9/2006 | Kaito et al. | |
| 2006/0204837 A1 | 9/2006 | Kaito et al. | |
| 2007/0048613 A1* | 3/2007 | Yanagida et al. | 429/245 |

FOREIGN PATENT DOCUMENTS

| | | | | |
|---|---|---|---|---|
| CN | 1694299 A | 11/2005 | | |
| CN | 1694300 A | 11/2005 | | |
| CN | 1901267 A | 1/2007 | | |
| DE | 60209116 T2 | 10/2006 | | |
| EP | 1430554 A | 12/2002 | | |
| JP | 2001-093583 A | 4/2001 | | |
| JP | 2004-055537 A | 2/2004 | | |
| JP | 2005-509247 A | 4/2005 | | |
| JP | 2007-095656 A | 4/2007 | | |
| JP | 2008-034215 A | 2/2008 | | |
| JP | 2008-047398 | * | 2/2008 | H01M 10/40 |
| JP | 2010-118216 A | 5/2010 | | |
| KR | 2007-0026086 A | 3/2007 | | |
| WO | 02/101854 A2 | 12/2002 | | |

OTHER PUBLICATIONS

International Search Report of PCT/JP2012/056614, mailing date of May 29, 2012.
Office Action dated Jul. 3, 2015, issued in counterpart Chinese Patent Application 201280013725.3, with English translation (9 pages).

* cited by examiner

POSITIVE ELECTRODE PLATE FOR NONAQUEOUS ELECTROLYTE SECONDARY BATTERY, METHOD FOR MANUFACTURING THE POSITIVE ELECTRODE PLATE, NONAQUEOUS ELECTROLYTE SECONDARY BATTERY, AND METHOD FOR MANUFACTURING THE BATTERY

TECHNICAL FIELD

The present invention relates to a positive electrode plate that is used for a nonaqueous electrolyte secondary battery and includes a positive electrode active material layer on a positive electrode substrate and a positive electrode substrate exposed portion on which the positive electrode active material layer is not formed, a method for manufacturing the positive electrode plate, a nonaqueous electrolyte secondary battery, and a method for manufacturing the battery.

BACKGROUND ART

Portable electronic equipment, electric vehicles (EVs), hybrid electric vehicles (HEVs), and other equipment that are becoming increasingly popular are requiring stricter specifications for the nonaqueous electrolyte secondary batteries employed in such equipment year after year. In particular, such a battery is required to be compact and lightweight and to have high capacity and output, excellent cycling characteristics, and stable performance.

An example of a nonaqueous electrolyte secondary battery is a lithium ion battery including a wound electrode assembly. The wound electrode assembly includes a positive electrode plate having a positive electrode active material layer on each face of a positive electrode substrate of long aluminum foil or other materials, a negative electrode plate having a negative electrode active material layer on each face of a negative electrode substrate of long copper foil or other materials, and a long separator of microporous polyolefin. The positive and negative electrode plates and the separator interposed therebetween are wound to form a columnar or flat electrode assembly. The positive electrode plate and the negative electrode plate are then connected to a positive electrode tab and a negative electrode tab, respectively, and the whole is stored in an outer body having a particular shape.

Another example is a lithium ion battery including a stacked electrode assembly. The stacked electrode assembly includes a positive electrode plate having a positive electrode active material layer on each face of a positive electrode substrate of aluminum foil or other materials, a negative electrode plate having a negative electrode active material layer on each face of a negative electrode substrate of copper foil or other materials, and a separator of microporous polyolefin. A plurality of layers of the positive and negative electrode plates are stacked with the separator interposed therebetween to form a stacked electrode assembly. Positive electrode tabs connected to the layers of the positive electrode plate are connected in parallel to each other, and negative electrode tabs connected to the layers of the negative electrode plate are connected in parallel to each other. The whole is stored in an outer body having a particular shape.

In the nonaqueous electrolyte secondary battery represented by such a lithium ion battery, in order for the negative electrode active material to smoothly absorb lithium ions desorbed from the positive electrode active material during charging, the negative electrode active material layer is typically arranged to protrude from the end of the positive electrode active material layer with the separator interposed therebetween. Thus, a positive electrode substrate exposed portion, which is formed on the positive electrode plate, faces the end of the negative electrode plate with the separator interposed therebetween.

In a battery having such a structure in which the positive electrode substrate exposed portion faces the end of the negative electrode plate with the separator interposed therebetween, burrs from the end of the negative electrode plate, powder from the electrode plate, or other substances may pierce the separator to cause short circuit. Such a short circuit may lead to a large current flow, resulting in heat emission.

To solve such a problem, techniques have been disclosed in which a protective layer is formed in a region adjacent to the positive electrode active material layer in a positive electrode substrate exposed portion on which a positive electrode active material layer is not formed.

For example, Patent Document 1 discloses a nonaqueous secondary battery in which an insulating layer of an insulating resin is formed on each face of the base sections of protrusions exposing metals of positive and negative electrodes in a wound electrode assembly. Thus, even if non-protruding sections of the positive and negative electrodes are exposed due to winding misalignment of a separator in the axial direction, the insulating layers prevent a short circuit between the base sections of the protrusions of the positive and negative electrodes and also prevent a short circuit caused by burrs due to, for example, punching of an electrode plate.

In addition, Patent Document 2 discloses a nonaqueous secondary battery including an active material mixture layer placed on at least one face of a collector of metal foil and a positive electrode having a portion exposing metal. The positive electrode together with the metal exposed portion faces a negative electrode with a separator interposed therebetween. A protective layer having a lower electronic conductivity than that of the metal and made of a non-insulating material is formed on an area of the metal exposed portion that faces the negative electrode with the separator interposed therebetween. If a part of one electrode pierces the separator to come in contact with the other electrode, such a structure can gently discharge a battery to thus prevent the battery from generating excessive heat and also allows equipment to detect the abnormality of the battery through the fall in battery voltage.

RELATED ART DOCUMENTS

Patent Documents

Patent Document 1: JP-A-2001-93583
Patent Document 2: JP-A-2007-95656

DISCLOSURE OF INVENTION

Problem to be Solved by the Invention

An efficient method for manufacturing a positive electrode plate having a positive electrode substrate exposed portion and a protective layer formed in a region adjacent to the positive electrode active material layer in a positive electrode substrate on which a positive electrode active material layer is not formed simultaneously applies a positive electrode active material mixture slurry and a protective layer slurry onto a long positive electrode substrate in the longitudinal direction of the long positive electrode substrate.

Here, the positive electrode active material layer of the positive electrode plate in a nonaqueous electrolyte secondary battery typically employs polyvinylidene fluoride as a binder. The protective layer formed in the positive electrode plate preferably employs, as a binder, the same polyvinylidene fluoride as that for the binder in the positive electrode active material layer in order to prevent deterioration of battery characteristics.

When the polyvinylidene fluoride is used as the binder for both the positive electrode active material layer and the protective layer and the positive electrode active material mixture slurry and the protective layer slurry are applied onto a long positive electrode substrate in the longitudinal direction of the long positive electrode substrate, the positive electrode plate obtains the positive electrode active material layer and the protective layer each having a nonuniform width.

Such a problem of nonuniform widths of the positive electrode active material layer and the protective layer may readily cause a short circuit between the negative electrode plate and the positive electrode plate in a region in which the protective layer has a small width.

As a result of repeated various experiments, the inventors of the invention have found that the problem can be solved by controlling the molecular weight relation of polyvinylidene fluoride contained as each binder in the positive electrode active material layer and the protective layer.

The present invention provides a highly reliable nonaqueous electrolyte secondary battery that includes a positive electrode plate having a positive electrode substrate exposed portion and a protective layer formed in a region adjacent to the positive electrode active material layer in the positive electrode substrate exposed portion and in which each of the positive electrode active material layer and the protective layer has a uniform width.

Means for Solving Problem

To achieve the object, a positive electrode plate for a nonaqueous electrolyte secondary battery of the invention includes: a positive electrode active material layer formed on a positive electrode substrate; and a positive electrode substrate exposed portion on which the positive electrode active material layer is not formed. In the positive electrode plate for a nonaqueous electrolyte secondary battery, the positive electrode substrate exposed portion has a region that is adjacent to the positive electrode active material layer and has a protective layer formed thereon, the positive electrode active material layer and the protective layer contain polyvinylidene fluoride, and the weight average molecular weight Mw of the polyvinylidene fluoride contained in the protective layer is larger than the weight average molecular weight Mw of the polyvinylidene fluoride contained in the positive electrode active material layer.

As a result of various studies, the inventors of the invention have found that applying the positive electrode active material mixture slurry and the protective layer slurry containing polyvinylidene fluoride having the same weight average molecular weight Mw onto a substrate causes the positive electrode active material mixture slurry to spread in the width direction, and this partially reduces the width of the protective layer. This results in nonuniform widths of the positive electrode active material layer and the protective layer.

To address this problem, increasing the weight average molecular weight Mw of the polyvinylidene fluoride contained in the protective layer slurry as compared with the weight average molecular weight Mw of the polyvinylidene fluoride contained in the positive electrode active material mixture slurry allows the positive electrode active material mixture slurry and the protective layer slurry to be uniformly applied and thus can stabilize the widths of the positive electrode active material layer and the protective layer.

In the invention, it is preferable that the polyvinylidene fluoride contained in the positive electrode active material layer have a weight average molecular weight Mw of 100,000 to 350,000 and more preferably 200,000 to 300,000.

If the polyvinylidene fluoride contained in the positive electrode active material layer has a weight average molecular weight Mw of less than 100,000, the viscosity of the positive electrode active material mixture slurry is reduced. Hence, to obtain a slurry having appropriate properties, the positive electrode active material mixture slurry is required to contain the polyvinylidene fluoride in a larger ratio. This reduces the ratio of the positive electrode active material, thereby lowering a battery capacity. If the polyvinylidene fluoride contained in the positive electrode active material layer has a weight average molecular weight Mw of more than 350,000, settling and gelation of the positive electrode active material mixture slurry tends to occur more easily. Thus, such polyvinylidene fluoride is unfavorable.

In the invention, it is preferable that the polyvinylidene fluoride contained in the protective layer have a weight average molecular weight Mw of 350,000 to 1,300,000 and more preferably 400,000 to 1,100,000.

If the polyvinylidene fluoride contained in the protective layer has a weight average molecular weight Mw of 350,000 or more, the positive electrode active material mixture slurry can be more effectively prevented from spreading in the width direction during application. If the polyvinylidene fluoride contained in the protective layer has a weight average molecular weight Mw of more than 1,300,000, the solubility of the polyvinylidene fluoride in N-methylpyrrolidone (NMP) as a solvent is reduced. This makes it difficult to yield a slurry having appropriate properties. Thus, such polyvinylidene fluoride is unfavorable.

In the invention, the weight average molecular weight Mw of polyvinylidene fluoride is determined through gel permeation chromatography (GPC). GPC is a method using a column that is filled with a gel having many pores and elutes a solution dissolving polyvinylidene fluoride having a larger weight average molecular weight Mw in a shorter period of time, thereby determining a weight average molecular weight Mw distribution.

In the invention, it is preferable that the protective layer have insulating properties, or have a lower electronic conductivity than that of the positive electrode substrate and non-insulating properties.

In the invention, it is preferable that the protective layer contain an inorganic oxide.

A protective layer containing the inorganic oxide obtains higher heat resistance and strength. This can reliably, effectively prevent the negative electrode plate from coming in direct contact with the positive electrode substrate even when burrs from the negative electrode plate or other substances pierce the separator. Here, a preferred method of adding an inorganic oxide to the protective layer is adding inorganic oxide particles to the protective layer.

It is preferable that the inorganic oxide be at least one selected from the group consisting of alumina, titania, and zirconia.

In the invention, it is preferable that the protective layer contain a conductive agent.

Even if a part of the negative electrode plate or other substances pierces the separator but no short circuit occurs, a protective layer having insulating properties allows such a battery to be charged and discharged. Continuously using the battery in such a condition over a long period of time may break the separator from the damaged point to thus cause a severe short circuit, and then the battery may generate excessive heat. Adding a conductive agent to the protective layer allows the protective layer to have a lower electronic conductivity than that of the positive electrode substrate of metal and to include a material having non-insulating properties. This allows the battery to be gently discharged to thus prevent the battery from generating excessive heat, and also allows equipment to detect the abnormality of the battery through the fall in battery voltage if a part of the negative electrode plate or other substances pierces the separator and the electrode plate comes in contact with the protective layer.

The conductive agent may be a carbon material. The carbon material is preferably graphite or carbon black, for example In the invention, the protective layer preferably contains an inorganic oxide and a conductive agent.

A protective layer containing both the inorganic oxide and the conductive agent can yield a safer nonaqueous electrolyte secondary battery.

In the invention, the positive electrode active material layer preferably contains the polyvinylidene fluoride in an amount of 1 to 10% by mass and more preferably 2 to 5% by mass with respect to the total amount of the positive electrode active material layer. The protective layer preferably contains the polyvinylidene fluoride in an amount of 10 to 20% by mass and more preferably 12 to 15% by mass with respect to the total amount of the protective layer.

In the invention, a preferred nonaqueous electrolyte secondary battery includes an electrode assembly in which the positive electrode plate for a nonaqueous electrolyte secondary battery and a negative electrode plate are stacked or wound with a separator interposed therebetween.

This provides a highly reliable nonaqueous electrolyte secondary battery employing the positive electrode plate in which each of the positive electrode active material layer and the protective layer has a uniform width.

The method for manufacturing a positive electrode plate for a nonaqueous electrolyte secondary battery of the invention is a method for manufacturing a positive electrode plate for a nonaqueous electrolyte secondary battery, the positive electrode plate that includes a positive electrode active material layer formed on a positive electrode substrate and a positive electrode substrate exposed portion on which the positive electrode active material layer is not formed, the positive electrode substrate exposed portion having a region that is adjacent to the positive electrode active material layer and has a protective layer formed thereon. The method includes simultaneously applying a positive electrode active material mixture slurry containing a positive electrode active material and polyvinylidene fluoride and a protective layer slurry containing polyvinylidene fluoride having a larger weight average molecular weight Mw than the weight average molecular weight Mw of the polyvinylidene fluoride contained in the positive electrode active material mixture slurry or applying one slurry of the positive electrode active material mixture slurry and the protective layer slurry onto the positive electrode substrate and then applying the other slurry onto the positive electrode substrate before the one slurry is dried.

The positive electrode plate might have the positive electrode active material layer and the protective layer each having a nonuniform width by simultaneously applying a positive electrode active material mixture slurry and a protective layer slurry each containing polyvinylidene fluoride onto a positive electrode substrate or applying one slurry of the positive electrode active material mixture slurry and the protective layer slurry onto the positive electrode substrate and then applying the other slurry onto the positive electrode substrate before the one slurry is dried.

The positive electrode active material layer and the protective layer can have a uniform width by configuring the weight average molecular weight Mw of polyvinylidene fluoride contained in the protective layer slurry to be larger than the weight average molecular weight Mw of polyvinylidene fluoride contained in the positive electrode active material mixture slurry.

In the method for manufacturing a positive electrode plate for a nonaqueous electrolyte secondary battery of the invention, it is preferable that the positive electrode active material mixture slurry and the protective layer slurry meet together in a die head of a die coater and the positive electrode active material mixture slurry and the protective layer slurry be simultaneously applied onto the positive electrode substrate.

To apply the positive electrode active material mixture slurry and the protective layer slurry onto a long positive electrode substrate, the positive electrode active material mixture slurry and the protective layer slurry preferably meet together in a die head of a die coater and are preferably, simultaneously applied onto the positive electrode substrate from the viewpoint of productivity. The invention is more effectively applied to a case in which the positive electrode active material mixture slurry and the protective layer slurry meet together in a die head of a die coater and the positive electrode active material mixture slurry and the protective layer slurry are simultaneously applied onto the positive electrode substrate, because such a case more likely to raise a problem of nonuniform widths of the positive electrode active material layer and the protective layer in the positive electrode plate.

In the method for manufacturing a positive electrode plate for a nonaqueous electrolyte secondary battery of the invention, it is preferable that the protective layer slurry have a viscosity of 0.50 to 1.80 Pa·s and more preferably 0.60 to 1.50 Pa·s.

This more reliably prevents bleeding in the boundary between the positive electrode active material mixture slurry and the protective layer slurry after applying and streaks in the protective layer after drying. It is preferable that the positive electrode active material mixture slurry have a viscosity of 1.50 Pa·s or more, more preferably 1.50 to 3.50 Pa·s, and even more preferably 1.80 to 3.00 Pa·s.

Effect of the Invention

The invention can provide a highly reliable nonaqueous electrolyte secondary battery employing a positive electrode plate in which each of a positive electrode active material layer and a protective layer has a uniform width.

BEST MODE(S) FOR CARRYING OUT THE INVENTION

An embodiment for carrying out the present invention will be described below in detail using examples and comparative examples. The examples below show examples of a nonaqueous electrolyte secondary battery for embodying the technical idea of the present invention and is not intended to specify the present invention as the examples. The present invention is equally applicable to various modifications without departing from the technical idea shown in the scope of claims.

Preparation of Positive Electrode Plate

Example 1

A positive electrode plate was prepared as follows: First, $LiNi_{0.35}Co_{0.35}Mn_{0.3}O_2$ as a positive electrode active material, carbon powder as a conductive agent, polyvinylidene fluoride (PVdF) as a binder, and N-methylpyrrolidone (NMP) as a solvent were kneaded so as to give a mass ratio of the positive electrode active material:carbon powder:PVdF of 88:9:3, thus yielding a positive electrode active material mixture slurry. Here, the polyvinylidene fluoride (PVdF) used had a weight average molecular weight Mw of 280,000.

Next, alumina powder, graphite as a conductive agent, polyvinylidene fluoride (PVdF) as a binder, and N-methylpyrrolidone (NMP) as a solvent were kneaded so as to give a mass ratio of alumina powder:graphite:PVdF of 83:3:14, thus yielding a protective layer slurry. Here, the polyvinylidene fluoride used had a weight average molecular weight Mw of 1,000,000.

Figure 1A:
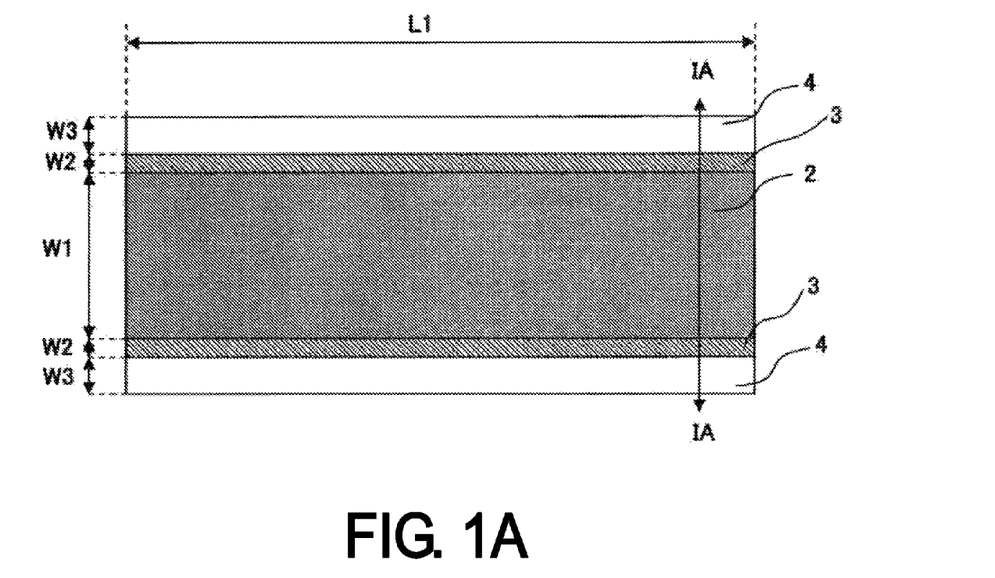
FIG. 1A is a view showing a positive electrode plate of examples and comparative examples.
Figure 1B:
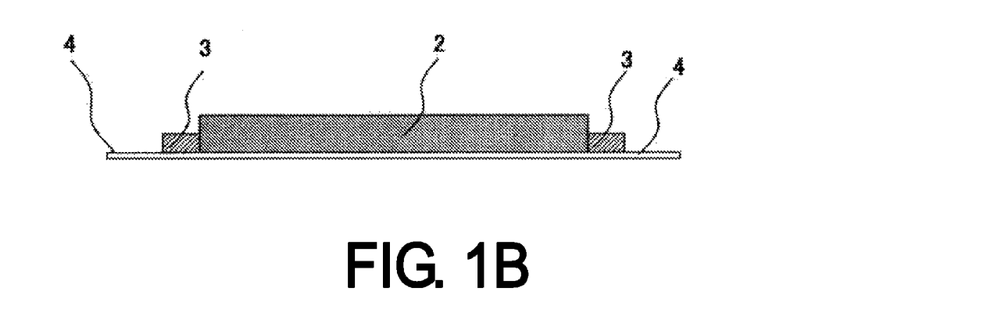
FIG. 1B is a sectional view taken along the line IA-IA in FIG. 1A.

The positive electrode active material mixture slurry and the protective layer slurry prepared through the method above were applied onto a positive electrode substrate of aluminum foil using a die coater. To simultaneously apply the positive electrode active material mixture slurry and the protective layer slurry onto the positive electrode substrate, the positive electrode active material mixture slurry and the protective layer slurry met together near an outlet in a die head and were applied. As shown in FIG. 1A, the positive electrode substrate used was an aluminum foil having a width of 250 mm and a thickness of 15 μm. The slurries were continuously applied over 200 m (L1 was 200 m) so as to form the following: a positive electrode active material layer 2 (the width W1 was 179 mm) in a central region in the width direction of the positive electrode substrate; a protective layer 3 (W2 was 7 mm) on each side of the positive electrode active material layer 2; and a positive electrode substrate exposed portion 4 (W3 was 28.5 mm) along the longitudinal direction on each end in the width direction of the positive electrode substrate. FIG. 1B is a sectional view taken along the line IA-IA in FIG. 1A.

Subsequently, the positive electrode plate having the positive electrode active material layer 2 and the protective layer 3 formed on the positive electrode substrate was passed through a dryer, thereby removing NMP as the slurry solvent to dry the positive electrode plate. After drying, the dried positive electrode plate was pressed with a roll press to yield a positive electrode plate of Example 1 including the positive electrode active material layer 2 having a thickness of 69 μm and the protective layer 3 having a thickness of 14 μm.

Example 2

A positive electrode plate was prepared as the positive electrode plate of Example 2 in the same manner as in Example 1 except that the protective layer contained polyvinylidene fluoride having a weight average molecular weight Mw of 630,000.

Example 3

A positive electrode plate was prepared as the positive electrode plate of Example 3 in the same manner as in Example 1 except that the protective layer contained polyvinylidene fluoride having a weight average molecular weight Mw of 500,000.

Example 4

A positive electrode plate was prepared as the positive electrode plate of Example 4 in the same manner as in Example 1 except that the protective layer contained polyvinylidene fluoride having a weight average molecular weight Mw of 350,000.

Comparative Example 1

A positive electrode plate was prepared as the positive electrode plate of Comparative Example 1 in the same manner as in Example 1 except that the protective layer contained polyvinylidene fluoride having a weight average molecular weight Mw of 280,000.

[Evaluation]

For the positive electrode plates of Example 1 and Comparative Example 1, the maximum values and minimum values of the width (W1) of the positive electrode active material layer and the width (W2) of the protective layer were determined over the whole region (L1 was 200 m) in the longitudinal direction in which the slurries were continuously applied. Table 1 shows the measurement results.

TABLE 1

|  | Weight average molecular weight Mw of PVdF Positive electrode active material layer/ protective layer | Width W1 (mm) of positive electrode active material layer | | Width W2 (mm) of protective layer | |
| --- | --- | --- | --- | --- | --- |
|  |  | Minimum | Maximum | Minimum | Maximum |
| Example 1 | 280,000/1,000,000 | 179 | 179 | 7 | 7 |
| Example 2 | 280,000/630,000 | 179 | 179 | 7 | 7 |
| Example 3 | 280,000/500,000 | 179 | 179 | 7 | 7 |
| Example 4 | 280,000/350,000 | 179 | 179 | 7 | 7 |
| Comparative Example 1 | 280,000/280,000 | 179 | 186 | 0 | 7 |

In Comparative Example 1 in which the protective layer contained the polyvinylidene fluoride having the same weight average molecular weight Mw as the weight average molecular weight Mw of the polyvinylidene fluoride contained in the positive electrode active material layer, the positive electrode active material layer had a maximum width of 186 mm in a region, where the protective layer had a width of 0 mm. In contrast, in Examples 1 to 4 in which the protective layer contained the polyvinylidene fluoride having a larger weight average molecular weight Mw than the weight average molecular weight Mw of the polyvinylidene fluoride contained in the positive electrode active material layer, the obtained positive electrode plate included the positive electrode active material layer having a uniform width of 179 mm and the protective layer having a uniform width of 7 mm in the whole region.

The viscosity of the protective layer slurry was next studied

Example 5

A positive electrode plate was prepared as the positive electrode plate of Example 5 in the same manner as in Example 1, in which the positive electrode active material mixture slurry had a viscosity of 2.10 Pa·s and the protective layer slurry had a viscosity of 0.45 Pa·s.

Example 6

A positive electrode plate was prepared as the positive electrode plate of Example 6 in the same manner as in Example 5 except that the protective layer slurry had a viscosity of 0.65 Pa·s.

Example 7

A positive electrode plate was prepared as the positive electrode plate of Example 7 in the same manner as in Example 5 except that the protective layer slurry had a viscosity of 0.77 Pa·s.

Example 8

A positive electrode plate was prepared as the positive electrode plate of Example 8 in the same manner as in Example 5 except that the protective layer slurry had a viscosity of 0.95 Pa·s.

Example 9

A positive electrode plate was prepared as the positive electrode plate of Example 9 in the same manner as in Example 5 except that the protective layer slurry had a viscosity of 1.20 Pa·s.

Example 10

A positive electrode plate was prepared as the positive electrode plate of Example 10 in the same manner as in Example 5 except that the protective layer slurry had a viscosity of 1.45 Pa·s.

Example 11

A positive electrode plate was prepared as the positive electrode plate of Example 11 in the same manner as in Example 5 except that the protective layer slurry had a viscosity of 2.33 Pa·s.

Comparative Example 2

A positive electrode plate was prepared as the positive electrode plate of Comparative Example 2 in the same manner as in Comparative Example 1, in which the positive electrode active material mixture slurry had a viscosity of 2.10 Pa·s and the protective layer slurry had a viscosity of 0.75 Pa·s.

In Examples 5 to 11 and Comparative Example 2, the viscosity of the positive electrode active material mixture slurry and the viscosity of the protective layer slurry were adjusted by controlling the ratio of NMP in the slurry. The viscosity of the positive electrode active material mixture slurry and the viscosity of the protective layer slurry were determined with a spiral viscometer (PC-1TL manufactured by Malcom Co., Ltd.) in a condition at a rotation speed of 40 rpm and a temperature of 25° C.

[Evaluation]

For the positive electrode plates in Examples 5 to 11 and Comparative Example 2, the maximum values and minimum values of the width (W1) of the positive electrode active material layer and the width (W2) of the protective layer were determined over the whole region (L1 was 200 m) in the longitudinal direction in which the slurries were continuously applied. In addition, the boundary between the positive electrode active material layer and the protective layer was checked for bleeding and the protective layer was checked for any streaks. Table 2 shows the results.

TABLE 2

| | Weight average molecular weight Mw of PVdF Positive electrode active material layer/protective layer | Width W1 (mm) of positive electrode mixture layer | | Width W2 (mm) of protective layer | | Viscosity of protective layer slurry | | |
|---|---|---|---|---|---|---|---|---|
| | | Min | Max | Min | Max | (Pa · S) | Streaks | Bleeding |
| Example 5 | 280,000/1,000,000 | 179 | 179 | 7 | 7 | 0.45 | Not observed | Observed |
| Example 6 | 280,000/1,000,000 | 179 | 179 | 7 | 7 | 0.65 | Not observed | Not observed |
| Example 7 | 280,000/1,000,000 | 179 | 179 | 7 | 7 | 0.77 | Not observed | Not observed |
| Example 8 | 280,000/1,000,000 | 179 | 179 | 7 | 7 | 0.95 | Not observed | Not observed |
| Example 9 | 280,000/1,000,000 | 179 | 179 | 7 | 7 | 1.20 | Not observed | Not observed |
| Example 10 | 280,000/1000,000 | 179 | 179 | 7 | 7 | 1.45 | Not observed | Not observed |

TABLE 2-continued

|  | Weight average molecular weight Mw of PVdF Positive electrode active material layer/protective layer | Width W1 (mm) of positive electrode mixture layer | | Width W2 (mm) of protective layer | | Viscosity of protective layer slurry | | |
| --- | --- | --- | --- | --- | --- | --- | --- | --- |
|  |  | Min | Max | Min | Max | (Pa·S) | Streaks | Bleeding |
| Example 11 | 280,000/1,000,000 | 179 | 179 | 7 | 7 | 2.33 | Observed | Not observed |
| Comparative Example 2 | 280,000/280,000 | 179 | 186 | 0 | 7 | 0.75 | Not observed | Observed |

In Examples 6 to 10 using the protective layer slurry having a viscosity of 0.65 to 1.45 Pa·s, no bleeding was observed in the boundary between the positive electrode active material layer and the protective layer, and no streak was generated on the protective layer. In contrast, in Example 5 using the protective layer slurry having a viscosity of 0.45 Pa·s, no streak was generated on the protective layer but a slight bleeding was partly observed in the boundary between the positive electrode active material layer and the protective layer. A positive electrode plate having such bleeding is unfavorable because the bleeding may reduce the area contributing a charge and discharge reaction in the positive electrode active material layer to thus lower the battery capacity. In Example 11 using the protective layer slurry having a viscosity of 2.33 Pa·s, no bleeding was observed in the boundary between the positive electrode active material layer and the protective layer but streaks were generated on the protective layer. A positive electrode plate having such streaks on the protective layer is unfavorable because the positive electrode substrate may come in direct contact with a negative electrode plate on the streaks.

The results reveal that a protective layer slurry having a viscosity of 0.65 to 1.45 Pa·s can prevent bleeding in the boundary between the positive electrode active material layer and the protective layer and streaks on the protective layer. This suggests that the protective layer slurry preferably has a viscosity of about 0.60 to 1.50 Pa·s.

Figure 2A:
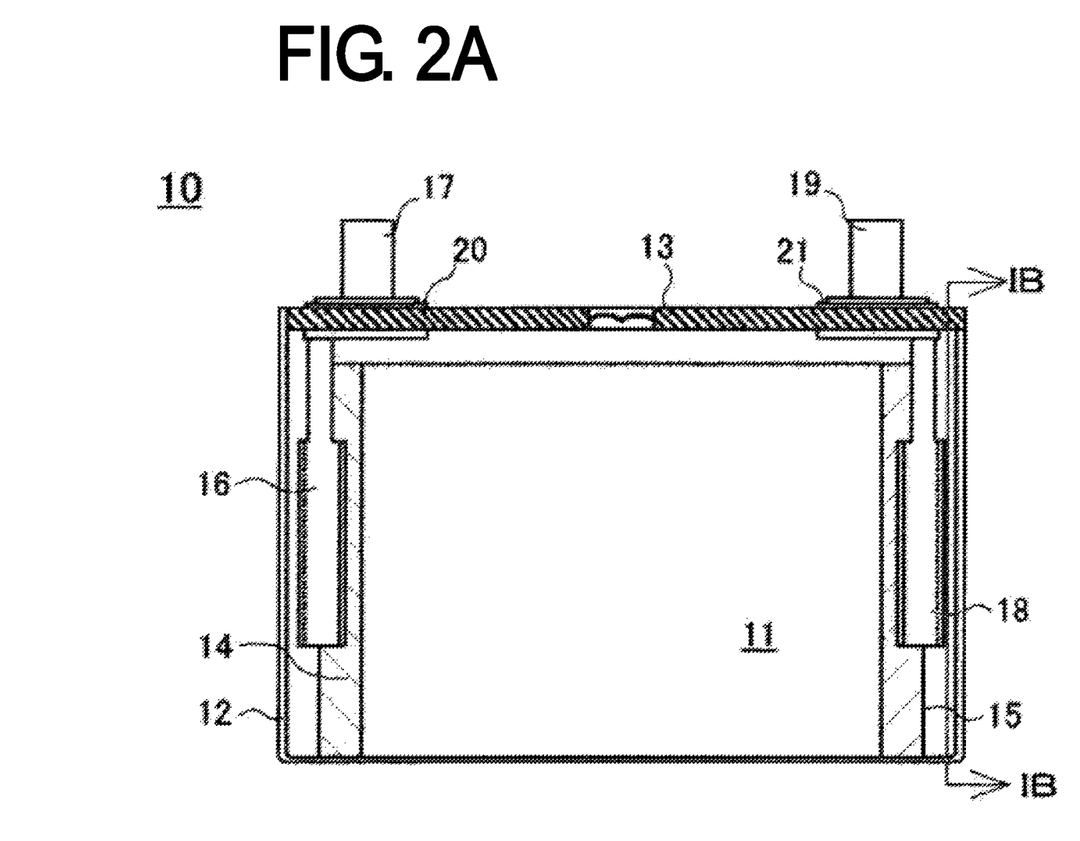
FIG. 2A is a perspective plan view showing the structure of a prismatic nonaqueous electrolyte secondary battery of the examples of the invention through an outer body.
Figure 2B:
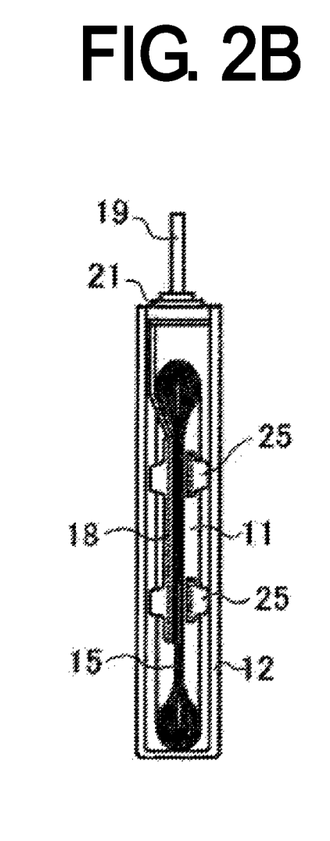
FIG. 2B is a sectional view taken along the line IB-IB in FIG. 2A.

The nonaqueous electrolyte secondary battery of the invention will next be described using a prismatic nonaqueous electrolyte secondary battery 10. In the prismatic nonaqueous electrolyte secondary battery 10, as shown in FIG. 2, a positive electrode plate 1 and a negative electrode plate 6 are wound with a separator 5 interposed therebetween (each not shown in the drawings) to yield a flat, wound electrode assembly 11. The electrode assembly 11 is stored in a prismatic battery outer can 12, and the battery outer can 12 is sealed with a sealing plate 13. The flat, wound electrode assembly 11 includes, on one end in the winding axis direction, a stacked positive electrode substrate exposed portion 14 in which layers of a positive electrode substrate exposed portion 4 on which no positive electrode active material layer is formed are stacked and, on the other end, a stacked negative electrode substrate exposed portion 15 in which layers of a negative electrode substrate exposed portion 8 on which no negative electrode active material layer is formed are stacked. The stacked positive electrode substrate exposed portion 14 is connected through a positive electrode collector 16 to a positive electrode terminal 17, and the stacked negative electrode substrate exposed portion 15 is connected through a negative electrode collector 18 to a negative electrode terminal 19. The positive electrode terminal 17 and the negative electrode terminal 19 are joined by crimping to a sealing plate 13 through insulating members 20 and 21, respectively, including an insulating plate, a gasket, and other members.

The prismatic nonaqueous electrolyte secondary battery 10 is manufactured by storing the flat, wound electrode assembly 11 in the battery outer can 12, laser-welding the sealing plate 13 to a mouth portion of the battery outer can 12, then pouring a nonaqueous electrolyte through an electrolyte pour hole (not shown in the drawings), and sealing the electrolyte pour hole.

A method for manufacturing the nonaqueous electrolyte secondary battery 10 will be described next.

[Preparation of Positive Electrode Plate]

A positive electrode plate was prepared in the same manner as in Example 1 except that the positive electrode active material layer 2 and the protective layer 3 were formed on each face of the positive electrode substrate. The positive electrode plate was prepared to have the positive electrode active material layer 2 having a width (W1) of 179 mm, the protective layer 3 having a width (W2) of 7 mm, and the positive electrode substrate exposed portion 4 having a width (W3) of 28.5 mm for each size shown in FIG. 1. Subsequently, the positive electrode plate was cut along the center line in the width direction thereof (on the positive electrode active material layer 2) and along the longitudinal direction on the positive electrode substrate exposed portion 4, thereby preparing a positive electrode plate 1 having the protective layer 3 and the positive electrode substrate exposed portion 4 on one end of the positive electrode active material layer 2 in the width direction of the positive electrode plate (the width (W4) of the positive electrode active material layer 2 was 90 mm, the width (W5) of the protective layer 3 was 7 mm, the width (W6) of the positive electrode substrate exposed portion 4 was 8 mm). In addition, the positive electrode plate was cut along the width direction so that the positive electrode plate 1 had a length of 3,870 mm.

[Preparation of Negative Electrode Plate]

The negative electrode plate 6 was prepared as follows: First, 98% by mass of graphite powder, 1% by mass of carboxymethyl cellulose, and 1% by mass of styrene-butadiene rubber were mixed, then water was added, and the mixture was kneaded to yield a negative electrode active material mixture slurry. The negative electrode active material mixture slurry was evenly applied onto each face of a negative electrode substrate of copper foil having a thickness of 10 μm so as to form a negative electrode substrate exposed portion 8 on each end in the width direction along the longitudinal direction. Subsequently, the negative electrode plate 6 with the negative electrode active material layer 7 was passed through a dryer, thereby removing water required for preparing the slurry to dry the negative electrode plate. After drying, the electrode plate was pressed with a roll press to yield a negative electrode plate having a thickness of 68 μm. Next, the obtained electrode was cut to have a width of 107 mm (the width (W7) of the negative electrode active material layer 7 was 97 mm, the width (W8) of the negative electrode substrate exposed portion 8 was 10 mm) and a length of 4,020 mm, thus yielding the negative electrode plate 6.

[Preparation of Wound Electrode Assembly]

Figure 3:
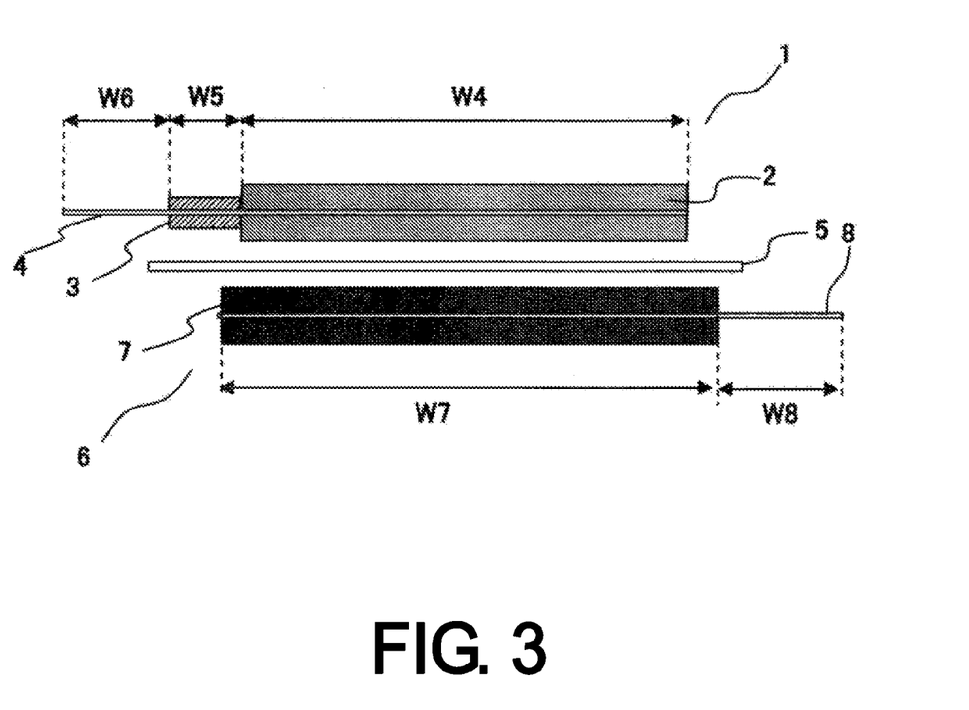
FIG. 3 is a view showing the positional relation of a positive electrode plate, a separator, and a negative electrode plate in the prismatic nonaqueous electrolyte secondary battery of the examples of the invention.

The positive electrode plate 1 and the negative electrode plate 6 prepared as above were arranged so that the positive electrode substrate exposed portion 4 was located on the opposite side of the negative electrode substrate exposed portion 8 in the width direction and were wound with a microporous polyethylene separator having a thickness of 0.03 mm interposed therebetween, thereby yielding a wound electrode assembly 11 having a stacked positive electrode substrate exposed portion 14 in which layers of the positive electrode substrate are stacked and a stacked negative electrode substrate exposed portion 15 in which layers of the negative electrode substrate are stacked on the respective sides. Here, as shown in FIG. 3, the cut end of the negative electrode plate 6 faces the protective layer 3 of the positive electrode plate 1 with the separator 5 interposed therebetween.

[Connection of Collector Plate and Sealing Plate]

A positive electrode collector plate 16 of aluminum and a negative electrode collector plate 18 of copper are prepared. Each collector plate has two convex portions (not shown in the drawings) protruding toward one side and being apart from each other. Two positive electrode collector plate receiving parts (not shown in the drawings) of aluminum and two negative electrode collector plate receiving parts 25 of copper are prepared. Each receiving part has a convex portion protruding toward one side.

Insulating members 20 and 21 are each disposed on the inner surface of a through-hole (not shown in the drawings) provided in the sealing plate 13 and on the outer surface of the battery near the through-hole. Next, the positive electrode collector plate 16 is arranged on the insulating member disposed on the battery inner surface of the sealing plate 13 so that the through-hole of the sealing plate 13 overlaps a through-hole (not shown in the drawings) provided in the positive electrode collector plate 16. Subsequently, an insert portion of an external positive electrode terminal 17 having a flange portion (not shown in the drawings) and the insert portion (not shown in the drawings) is inserted through the through-hole of the sealing plate 13 and the through-hole of the positive electrode collector plate 16 from the battery outer side. The diameter of a lower part (a part inside the battery) of the insert portion is expanded in this condition, thereby crimping and fixing the external positive electrode terminal 17 to the sealing plate 13 together with the positive electrode collector plate 16.

The negative electrode side is processed in a similar manner, thereby crimping and fixing an external negative electrode terminal 19 to the sealing plate 13 together with the negative electrode collector plate 18. Such a process integrates the members and electrically connects the positive and negative electrode collector plates 16 and 18 to the positive and negative electrode external terminals 17 and 19, respectively. In addition, the positive and negative electrode external terminals 17 and 19 protrude from the sealing plate 13 while being insulated from the sealing plate 13.

[Attachment of Collector Plate]

The positive electrode collector plate 16 and the positive electrode collector plate receiving parts are disposed on respective faces of the stacked positive electrode substrate exposed portion 14 in the wound electrode assembly 11 so that the respective convex portions face each other with the stacked positive electrode substrate exposed portion 14 interposed therebetween. Subsequently, a pair of electrodes for welding are pressed against the back side of the convex portion of the positive electrode collector plate 16 and the back side of the convex portion of the positive electrode collector plate receiving part, and an electric current flows through the pair of electrodes for welding, thereby resistance-welding the positive electrode collector plate 16 and the positive electrode collector plate receiving part to the positive electrode substrate exposed portion. This process allows the positive electrode collector plate 16 and the positive electrode collector plate receiving part to be fixed to the stacked positive electrode substrate exposed portion 14.

The negative electrode side is processed in a similar manner, thereby resistance-welding the negative electrode collector 18 and the negative electrode collector receiving part 25 to the stacked negative electrode substrate exposed portion 15.

Next, the wound electrode assembly 11 is wrapped with a polypropylene plate and stored in the battery outer can 12. The sealing plate 13 is then laser-welded to the mouth portion of the battery outer can 12.

[Preparation of Electrolyte]

In a mixed solvent of ethylene carbonate and diethyl carbonate at a volume ratio of 3:7, $LiPF_6$ is dissolved so as to give a concentration of 1 mol/L, thereby preparing a nonaqueous electrolyte.

A particular amount of the nonaqueous electrolyte prepared through the method above is poured through the electrolyte pour hole (not shown in the drawings) provided in the sealing plate 13, and then the electrolyte pour hole is sealed with a sealing member, thus preparing a prismatic nonaqueous electrolyte secondary battery 10.

As described above, the invention can provide a positive electrode plate in which each of the positive electrode active material layer and the protective layer has a uniform width and can provide a highly reliable nonaqueous electrolyte secondary battery by using the positive electrode plate.

The examples above have described the case using the flat, wound electrode assembly in which the positive electrode plate and the negative electrode plate are wound with the separator interposed therebetween. The invention also achieves the same action and effect on a stacked electrode assembly as well as on a cylindrical wound electrode assembly and an ellipsoidal wound electrode assembly as alternative wound electrode assemblies.

The examples above have exemplified that a slurry is applied onto a positive electrode substrate so as to form the protective layer 3 on each side of the positive electrode active material layer 2 in the width direction. The invention also achieves the same action and effect on the case in which a slurry is applied onto a positive electrode substrate so as to form the protective layer 3 on a single side of the positive electrode active material layer 2 in the width direction.

The examples above have exemplified that the positive electrode active material mixture slurry and the protective layer slurry meet together in a die head of a die coater and the positive electrode active material mixture slurry and the protective layer slurry are simultaneously applied onto the positive electrode substrate. However, the invention is applicable to a case in which the slurries do not meet in the die head but meet at the outside of a die head (the leading end of a die head) as another method. The positive electrode active material mixture slurry and the protective layer slurry may be applied onto the positive electrode substrate using different die heads as a conceivable method. In this case, the positive electrode active material mixture slurry and the protective layer slurry do not necessarily meet in a die head to be applied. Alternatively, the respective die heads for the positive electrode active material mixture slurry and the protective layer slurry may be aligned, and the slurries may be simultaneously applied onto a positive electrode substrate. The respective die heads may also be shifted back and forth and one slurry may be applied on a positive electrode substrate before the other slurry is dried.

<Other Matters>

(Additional Matter)

Examples of the positive electrode active material in the invention include lithium transition-metal composite oxides such as lithium cobalt oxide ($LiCoO_2$), lithium manganese oxide ($LiMn_2O_4$), lithium nickel oxide ($LiNiO_2$), lithium nickel manganese composite oxide ($LiNi_{1-x}Mn_xO_2$ ($0<x<1$)), lithium nickel cobalt composite oxide ($LiNi_{1-x}Co_xO_2$ ($0<x<1$)), and lithium nickel cobalt manganese composite oxide ($LiNi_xCo_yMn_zO_2$ ($0<x<1$, $0<y<1$, $0<z<1$, $x+y+z=1$)). The lithium transition-metal composite oxide may further contain Al, Ti, Zr, Nb, B, Mg, or Mo, for example. Examples include lithium transition-metal composite oxides represented by $Li_{1+a}Ni_xCo_yMn_zM_bO_2$ (M is at least one element selected from Al, Ti, Zr, Nb, B, Mg, and Mo, $0\le a\le 0.2$, $0.2\le x\le 0.5$, $0.2\le y\le 0.5$, $0.2\le z\le 0.4$, $0\le b\le 0.02$, $a+b+x+y+z=1$).

A usable negative electrode active material is a carbon material capable of absorption and desorption of lithium ions. Examples of the carbon material capable of absorption and desorption of lithium ions include graphite, non-graphitizable carbon, graphitizable carbon, fibrous carbon, coke, and carbon black. Among them, graphite is preferably used in particular. Examples of a non-carbon based material include silicon, tin, and an alloy and an oxide mainly containing them.

A nonaqueous solvent (organic solvent) in a nonaqueous electrolyte usable in the invention is carbonates, lactones, ethers, ketones, esters, and other solvents that have been generally used in a nonaqueous electrolyte secondary battery, and these solvents may be used as a mixture of two or more of them. Example of the solvent usable include cyclic carbonates such as ethylene carbonate, propylene carbonate, and butylene carbonate and chain carbonates such as dimethyl carbonate, ethyl methyl carbonate, and diethyl carbonate. In particular, a mixed solvent of a cyclic carbonate and a chain carbonate is preferably used. An unsaturated cyclic carbonate such as vinylene carbonate (VC) may be added to the nonaqueous electrolyte.

In the nonaqueous electrolyte secondary battery of the invention, an electrolyte salt used may be an electrolyte salt that has been generally used in lithium ion secondary batteries. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, $LiB(C_2O_4)_2$, $LiB(C_2O_4)F_2$, $LiP(C_2O_4)_3$, $LiP(C_2O_4)_2F_2$, $LiP(C_2O_4)F_4$, and a mixture of those materials. Of these, $LiPF_6$ is preferable in particular. The amount of dissolution of the electrolyte salt with respect to the nonaqueous solvent is preferably from 0.5 to 2.0 mol/L.

The separator used in the invention is preferably a porous separator of polyolefin such as polypropylene (PP) and polyethylene (PP). In particular, a separator having a three-layer structure of polypropylene (PP) and polyethylene (PE) (PP/PE/PP or PE/PP/PE) is preferably used. A polymer electrolyte may also be used as the separator.

EXPLANATIONS OF LETTERS OR NUMERALS

1 Positive electrode plate
2 Positive electrode active material layer
3 Protective layer
4 Positive electrode substrate exposed portion
5 Separator
6 Negative electrode plate
7 Negative electrode active material layer
8 Negative electrode substrate exposed portion
10 Prismatic nonaqueous electrolyte secondary battery
11 Wound electrode assembly
12 Battery outer can
13 Sealing plate
14 Stacked positive electrode substrate exposed portion
15 Stacked negative electrode substrate exposed portion
16 Positive electrode collector
17 Positive electrode terminal
18 Negative electrode collector
19 Negative electrode terminal
20 and 21 Insulating member
25 Negative electrode collector receiving part

The invention claimed is:

1. A positive electrode plate for a nonaqueous electrolyte secondary battery, the positive electrode plate comprising:
    a positive electrode substrate;
    a positive electrode active material layer formed on the positive electrode substrate; and
    a positive electrode substrate exposed portion on which the positive electrode active material layer is not formed,
    the positive electrode substrate exposed portion having a region that is adjacent to the positive electrode active material layer and has a protective layer formed thereon,
    the positive electrode active material layer and the protective layer containing polyvinylidene fluoride, and
    the weight average molecular weight Mw of the polyvinylidene fluoride contained in the protective layer being larger than the weight average molecular weight Mw of the polyvinylidene fluoride contained in the positive electrode active material layer.

2. The positive electrode plate for a nonaqueous electrolyte secondary battery according to claim 1, wherein the polyvinylidene fluoride contained in the positive electrode active material layer has a weight average molecular weight Mw of 100,000 to 350,000.

3. The positive electrode plate for a nonaqueous electrolyte secondary battery according to claim 1, wherein the polyvinylidene fluoride contained in the protective layer has a weight average molecular weight Mw of 350,000 to 1,300,000.

4. The positive electrode plate for a nonaqueous electrolyte secondary battery according to claim 1, wherein the protective layer has insulating properties, or has a lower electronic conductivity than that of the positive electrode substrate.

5. The positive electrode plate for a nonaqueous electrolyte secondary battery according to claim 1, wherein the protective layer contains an inorganic oxide.

6. The positive electrode plate for a nonaqueous electrolyte secondary battery according to claim 4, wherein the protective layer contains a conductive agent.

7. The positive electrode plate for a nonaqueous electrolyte secondary battery according to claim 5, wherein the inorganic oxide is at least one selected from the group consisting of alumina, titania, and zirconia.

8. The positive electrode plate for a nonaqueous electrolyte secondary battery according to claim 6, wherein the conductive agent is a carbon material.

9. A nonaqueous electrolyte secondary battery comprising an electrode assembly in which a positive electrode plate and a negative electrode plate are stacked or wound with a separator interposed therebetween, the positive electrode plate including:
    a positive electrode active material layer formed on a positive electrode substrate; and a positive electrode substrate exposed portion on which the positive electrode active material layer is not formed, the positive electrode substrate exposed portion having a region that is adjacent to the positive electrode active material layer and has a protective layer formed thereon, the positive electrode active material layer and the protective layer containing polyvinylidene fluoride, and the weight average molecular weight Mw of the polyvinylidene fluoride contained in the protective layer being larger than the weight average molecular weight Mw of the polyvinylidene fluoride contained in the positive electrode active material layer.

10. A method for manufacturing a positive electrode plate for a nonaqueous electrolyte secondary battery, the positive electrode plate including a positive electrode active material layer formed on a positive electrode substrate and a positive electrode substrate exposed portion on which the positive electrode active material layer is not formed, the positive electrode substrate exposed portion having a region that is adjacent to the positive electrode active material layer and has a protective layer formed thereon, the method comprising simultaneously applying a positive electrode active material mixture slurry containing a positive electrode active material and polyvinylidene fluoride and a protective layer slurry containing polyvinylidene fluoride having a larger weight average molecular weight Mw than the weight average molecular weight Mw of the polyvinylidene fluoride contained in the positive electrode active material mixture slurry or applying one slurry of the positive electrode active material mixture slurry and the protective layer slurry onto the positive electrode substrate and then applying the other slurry onto the positive electrode substrate before the one slurry is dried.

11. The method for manufacturing a positive electrode plate for a nonaqueous electrolyte secondary battery according to claim 10, wherein the positive electrode active material mixture slurry and the protective layer slurry meet together in a die head of a die coater and the positive electrode active material mixture slurry and the protective layer slurry are simultaneously applied onto the positive electrode substrate.

12. The method for manufacturing a positive electrode plate for a nonaqueous electrolyte secondary battery according to claim 10, wherein the polyvinylidene fluoride contained in the positive electrode active material layer has a weight average molecular weight Mw of 100,000 to 350,000, and the polyvinylidene fluoride contained in the protective layer has a weight average molecular weight Mw of 350,000 to 1,300,000.

13. The method for manufacturing a positive electrode plate for a nonaqueous electrolyte secondary battery according to claim 10, wherein the protective layer has insulating properties, or has a lower electronic conductivity than that of the positive electrode substrate and non-insulating properties.

14. The method for manufacturing a positive electrode plate for a nonaqueous electrolyte secondary battery according to claim 10, wherein the protective layer slurry contains both or either of an inorganic oxide and a conductive agent.

15. The method for manufacturing a positive electrode plate for a nonaqueous electrolyte secondary battery according to claim 10, wherein the protective layer slurry has a viscosity of 0.60 to 1.50 Pa·s.

16. The method for manufacturing a positive electrode plate for a nonaqueous electrolyte secondary battery according to claim 10, wherein the positive electrode active material mixture slurry has a viscosity of 1.50 Pa·s or more.

17. A method for manufacturing a nonaqueous electrolyte secondary battery, the method comprising preparing an electrode assembly by stacking or winding the positive electrode plate and a negative electrode plate with a separator interposed therebetween, the positive electrode plate including:

a positive electrode substrate;

a positive electrode active material layer formed on the positive electrode substrate; and a positive electrode substrate exposed portion on which the positive electrode active material layer is not formed, the positive electrode substrate exposed portion having a region that is adjacent to the positive electrode active material layer and has a protective layer formed thereon, the method including simultaneously applying a positive electrode active material mixture slurry containing a positive electrode active material and polyvinylidene fluoride and a protective layer slurry containing polyvinylidene fluoride having a larger weight average molecular weight Mw than the weight average molecular weight Mw of the polyvinylidene fluoride contained in the positive electrode active material mixture slurry or applying one slurry of the positive electrode active material mixture slurry and the protective layer slurry onto the positive electrode substrate and then applying the other slurry onto the positive electrode substrate before the one slurry is dried.

18. The nonaqueous electrolyte secondary battery according to claim 9, wherein the protective layer has a lower electronic conductivity than that of the positive electrode substrate.

19. The method for manufacturing a nonaqueous electrolyte secondary battery according to claim 17, wherein the protective layer has a lower electronic conductivity than that of the positive electrode substrate.

* * * * *